United States Patent [19]

Salkinoja-Salonen

[11] 4,169,049
[45] Sep. 25, 1979

[54] WASTE WATER PURIFYING PROCEDURE

[75] Inventor: Mirja Salkinoja-Salonen, Helsinki, Finland

[73] Assignee: Enso-Gutzeit Osakeyhtio, Helsinki, Finland

[21] Appl. No.: 874,523

[22] Filed: Feb. 2, 1978

[30] Foreign Application Priority Data

Jul. 1, 1977 [FI] Finland .................................. 772069

[51] Int. Cl.$^2$ .............................................. C02C 1/04
[52] U.S. Cl. ........................................ 210/3; 210/11; 210/17; 435/251
[58] Field of Search .................... 210/2, 11, 17, 3, 16; 195/2

[56] References Cited

U.S. PATENT DOCUMENTS

| 1,437,394 | 12/1922 | Brown | 210/17 X |
| 3,660,278 | 5/1972 | Mimura et al. | 210/11 |
| 3,700,590 | 10/1972 | Burton | 210/17 |
| 3,871,956 | 3/1975 | Azarowicz | 210/11 X |

Primary Examiner—Thomas G. Wyse
Attorney, Agent, or Firm—Toren, McGeady and Stanger

[57] ABSTRACT

Waste water purifying procedure intended to be used in treatment of waste water containing aromatic compounds. In a biofilter in a layer containing bark of wood there is formed a bacterial population comprising one or several of the bactery strains deposited in the Universite of Helsinki Institute of General Microbiology under the deposition codes YM 134-202 and YM 241-268 and which have been formed by packing into biofilters crushed coniferous tree bark and bacteriferous water, ooze, mud or bark residues taken from a water body polluted by chlorinated and unchlorinated phenols and by aromatic carboxylic acids and by thereafter feeding into the biofilters water containing said substances, whereby the bactery strains are characterized by tolerance of the presence of chlorinated and unchlorinated phenols and of aromatic carboxylic acids, and the waste water to be purified is conducted through the biofilter, whereby the waste water is purified by effect of action of the bactery population.

8 Claims, No Drawings

WASTE WATER PURIFYING PROCEDURE

The effluents from cellulose pulp mills contain an abundance of aromatic compounds, which are produced by decomposition of the lignin present in wood. As the lignin decomposition products and chlorine react in connection with the pulp bleaching process, sclorinated phenols are further produced. These are carried by the bleaching water into water bodies, where they undergo no worthwhile decomposition, according to studies that have been made. Chlorinated phenols in particular are highly toxic and they constitute at present the most notable group of substances poisoning the water bodies. The harmfulness of bleaching effluents to the fish fauna and to many of the microorganisms in the waters has been established in numerous studies. Bleaching effluents have a comparatively low BOD (biological oxygen demand), and this too is a clear indication of the water's poisonous nature.

At present, the bleaching effluents from sulfate cellulose mills are mostly released into water bodies untreated. Recently the idea of treating bleaching effluents by concentration, evaporation and ultimately burning has been suggested, whereby the water pollution could be avoided. Analyses of bleaching waters reveal, however, that they contain polychlorinated phenols, which condense into dioxines on heating. Dioxines, again, are not decomposed at temperatures lower than 800° C. and therefore the formation of dioxines in connection with the burning appears likely. Since dioxines are highly toxic, tetrachloride benzodioxine ("Seveso poison") in particular, burning of the effluent is not able to solve the waste problem imposed by chlorinated phenols. Purification of bleaching effluent in active sludge plants is not feasible either because chlorinated phenols kill the bacteries and render the plant inoperable.

The object of the present invention is to eliminate the drawbacks mentioned and to provide a procedure by which effluents carrying aromatic compounds can be treated so that they become harmless, before they are released into water bodies. The invention is characterized in that in a bacterial filter in a layer containing wood bark a bacterial population is established which comprises one or several of the bactery strains deposited at the general institute of microbiology of the University of Helsinki under the deposition codes YM 134-202 and YM 241-268, said strains having been formed by packing coniferous tree bark crushings and bacteriferous water, mud or bark residue taken from a water body polluted by chlorinated and unchlorinated phenols and aromatic carboxylic acids and thereafter feeding into bacterial filters water containing said substances, whereby the bactery strains have as a peculiar characteristic the ability to withstand the presence of chlorinated and unchlorinated phenols and aromatic carboxylic acids, and that the effluent to be purified is conducted through the biofilter, whereby the effluent is purified by action of the bacterial population.

When the procedure is employed in the purification of effluent containing tri- and tetrachlorophenols, a bacterial population is established in the biofilter which contains at least one strain growing in trichlorophenol which belongs to the deposited bacterial strains YM 241-268 and at least one strain growing in tetrachlorophenol which belongs to the said bacterial strains. When bleaching effluent is conducted through the biofilter thereafter, said compounds will also be decomposed by effect of bacterial action.

The foundation of the invention is the observation that an abundant microbial flora is living in water bodies polluted by bleaching effluents from sulfate cellulose mills. In mud and bark samples taken from such waters, between $10^4$ and $10^6$ living microbial cells per millilitre have been found. Thus such living organisms exist which thrive in spite of the presence of aromatic lignin decomposition products and even of chlorinated phenols. These microbe populations living in the nature are not in themselves able to live in overflow waters from the bleaching plant, where the concentration of said substances is about 20–50fold. But it is possible to prepare such a population in the laboratory by inoculating a biofilter with said bacteriferous mud and bark samples. In this manner a bacterial population has been obtained which grows in bleaching effluent containing chlorinated phenols and which at the same time biologically purifies the bleaching effluent. As a result, the brown colour of the water disappears in the biofilter and the concentrations of aromatic carboxylic acids and chlorinated and unchlorinated phenol derivatives are significantly reduced.

When treating bleaching effluent by the procedure of the invention, the most notable advantage gained is that the release of chlorinated phenols into water bodies can be prevented without having to resort to measures which lead to the formation of the dangerous dioxines. Moreover, the procedure can be carried out using biofilters known in themselves in prior art, by means of which for instance evil-smelling sulphurous compounds have been removed from waste waters. The biofilter comprises a layer of timber bark, preferably pine bark roughs, in which the bacteria become fixed.

It is favourable in view of the purifying efficiency, to circulate the waste water to be treated through the biofilter several times. When air is conducted suitably into the biofilter, conditions are established in the biofilter which are partly aerobic and partly anaerobic. Preliminary experiments indicate that best purifying results are obtained when the effluent passes through an aerobic stage and an anaerobic stage in alternation. For the anaerobic stage, the water may be circulated into an anaerob container separate from the biofilter and which may equally be a biofilter filled with timber bark. Instead of such circulation, the purification may also be carried out as a three stage process in which the waste water is to begin with conducted into the biofilter in aerobic conditions, then into an anaerob container and finally once again into aerobic conditions.

When purifying bleaching effluents from a sulfate pulp mill, it is advantageous to mix together effluents from the chlorination stage and the alkali stage in order to adjust the pH of the water to a value which is favourable in view of the purifying process, whereby neutralizing becomes unnecessary. A suitable pH was reached in trials when the proportion both of effluent from the chlorinating stage and of that from the alkali stage in the mixture was about 50%.

In order to elucidate the invention, there follows a detailed description of the enriching of the bacterial population and of purifying trials that have been made, with the results gained therein.

From a water body close to the bleaching plant of a sulfate cellulose mill samples were taken, consisting of water, bottom ooze, shore mud and bark slush from the wet barking plant. The samples were derived partly from aerobic and partly from anaerobic conditions, and the count of living microbial cells in the samples was $10^4$ to $10^6$ per ml. The occurrence of chlorinated phenols in the waters at one of the sampling sites is presented in Table I.

The bleaching effluent-purifying bacterial population was established in laboratory equipment of which the most important component was a biofilter. As biofilters, glass vessels with input and output pipes were used in which a fairly thick layer of pine bark crushings and the above-mentioned samples obtained from the nature were packed. The mixing proportions of the samples varied in different equipment units. Each equipment unit had the biofilter connected by said pipes with an anaerob container of considerably larger volume. The water going into the biofilter could be fed through the input pipe into the upper part of the biofilter, from which it flowed downward through the crushed bark layer. Air was also supplied into the input pipe so that an extensive aerobic zone was formed in the biofilter. The water running down on the bottom of the biofilter was circulated by means of a peristaltic pump through the anaerob container and back to the top of the biofilter. It was possible, however, to conduct the water past the anaerob tank as well.

The biofilters were percolated at 17° to 20° C. with water from the discharge water bodies of a sulfate cellulose mill and of a bleaching plant, this water containing chlorinated phenols as stated in Table I, according to analysis. As evidenced by measurement, the water, which had pH 7-8, was an approximately 20-fold dilution of the overflow waters from the bleaching plant. After about 6 weeks' percolation an abundant microbe flora had arisen in the apparatus. Bacteria were present not only in the circulated water but in ample numbers also affixed to the bark crushings layer in the biofilter. After the bacterial density in the liquid phase had gained sufficient height, feeding of undiluted overflow water from the chlorination and alkali steps into the biofilter was commenced. The analyses of these waters, as regards polychlorinated phenols, are stated in Table 1. In addition to polychlorinated phenols, the bleaching effluents contained an approximately 200-fold quantity of various unchlorinated lignin decomposition products and possibly also monochlorinated phenols, which were not analysed. In the course of such water supply the density and quality of the population in the biofilter were continuously monitored. It was found that when overflow waters from the chlorination and alkali steps were supplied mixed about 1:1 (pH about 6), the microbe population in the biofilter was preserved and it began to purify the water supplied into the filter.

The growth of population taking place during supply of bleaching water proves that the bleaching water contains enough nutrients for maintenance of the bactery strain. The external sign of purification of the effluent taking place was disappearance of the brown colour, and the analyses showed a remarkable reduction of the chlorinated phenols content. Best results were achieved when purifying a mixture of 50% effluent from the chlorination step and 50% from the alkali step. The mixture had pH about 6, temperature 13°-17° C. and purifying time 3 days, during which period the water circulated 2-3 times through the biofilter. Table I shows the results of purification. The "other chlorinated aromatics" given as one single group in the table are alkyl substituted polychlorinated phenols and diphenols. In regard of most of the phenol groups the results have to be considered good, and it is believed that they can be further improved when progress is made in optimating the treatment time and treatment conditions. In the case of dichlorophenols there was no purification to speak of, but these are present in a quantity less than 10% of the total of polychlorinated phenols. In addition to the chlorinated phenols, in the same connection the following toxic phenol derivatives and aromatic carboxylic acids can also be removed from the effluent: vanillic acid, veratric acid, ferulic acid, syringic acid, sinapinic acid, guajacol, phenol, cinnamic acid, hydrocinnamic acid, benzoic acid, and parahydroxybenzoic acid. During the purification the chloride content of the water, initially less than 20 mg/l Cl$^-$, increased to higher than 200 mg/l Cl$^-$. In a trial of five days duration the BOD value of the water went down to one half of the original. In purifying trials made with unmixed bleaching effluent from the alkali step, the results were rather inferior to those shown in the table. The same was true when the effluent was circulated past the anaerob tank. It is obvious in fact that the biological decomposition of chlorinated phenols and their derivatives into inorganic chlorine compounds requires a multistage purifying process wherein the water is subjected at least once to aerobic and at least once to anaerobic conditions.

The bacterial population enriched into the purifying apparatus is a mixed population composed of a plurality of bactery strains and differs completely e.g. from the microbial flora which is active in active sludge plants purifying municipal waste waters. This mixed population also differs from the microbe flora which lives in the nature in water bodies where bleaching plants discharge their effluents, in that the latter as such are unable to purify the bleaching effluent. A common feature of all bacteria in the mixed population is the ability to tolerate the presence of chlorinated and unchlorinated phenols and of aromatic carboxylic acids at the concentrations encountered in bleaching effluent, and part of them at least were found to tolerate chlorinated phenols at concentrations about 100 times those in the bleaching waters presented in Table 1. It is furthermore characteristic of the bacteria that they are able to utilize aromatic compounds as carbon and energy sources, and some of them also are able to utilize chlorinated phenols.

In view of isolating the bactery strains occurring in the mixed population, liquid samples with bactery count about $10^9$ per ml were taken from the biofilter. The samples were diluted so that the bacterial concentration decreased to about one-millionth part of the initial, and the diluted liquid was pipetted onto a series of dishes with a nutrient substrate coagulated with agar. Different dishes had different substrate compositions, and the nutrient substances used were vanillic acid (va), veratric acid (ve), ferulic acid (fe), parahydroxybenzoic acid (pohb), syringic acid (sy) and 2346-tetrachlorophenol (2346 f). Moreover, inorganic salts were used in the substrates, such as $CaCl_2$, $FeSO_4$, $MgSO_4$, $NH_4Cl$ and $KH_2PO_4$. The bacteria were allowed to grow at room temperature 2-7 days, during which time bacterial colonies appeared on the dishes. Each different type of colony was isolated in the dish and purified in normal manner. The pure bacterial strains have been deposited as cold-dried preparations at the Helsinki University Institute of General Microbiology, their deposition codes being YM 134-202 and YM 241-268.

The isolated bactery strains and their most important characteristics are presented in Table 2. The isolation code of each bactery strain contains an abbreviation of the name of that nutrient in which the strain was enriched. Regarding other properties of the bacteria it may be said that they utilize nitrate, but not milk, gelatine, starch, thyrosine or cellulose and that they are unable to produce hydrogen disulphide.

The great majority of the bactery strains in the mixed population belong to Groups V-VI of the classification in Bergey's Manual (1974), and the fluorescent bacteria belong to genus Pseudomonas. In the population small amounts were also found of sheathed bacteria belonging to Group I (Sphaerotilus, Leptothrix), bacteria with excrescences and/or stalks belonging to Group II (Hyphomicrobium, Caulobacter), spirochetes belonging to Group III and spiral and curved bacteria belonging to Group IV (Spirillum). These strains could not be isolated and deposited alive, however.

The genesis of the bacterial population living in bleaching effluent is explainable in the light of present bacteriological knowledge in that in connection with the population enriching conditions are created in which microbes potentially suitable for the decomposition of aromatic substances live together at a high microbe density. Hereby conditions are established for gene exchange between these bacteria. More active in the gene exchange are probably the so-called plasmids, which are inheritance units occurring separately from the chromosome and frequently coding the genes of decomposition enzymes. They are characterized by easy transfer from one microbial cell to another when the cells gain immediate contact. After a period of sufficient length as the result of gene exchange there has been produced a number of microbes having sufficient enzyme armament for the decomposition of aromatic compounds.

It is obvious to a person skilled in the art that various embodiments of the invention are not confined to the purifying process directed to bleaching effluent containing chlorinated phenols, but that they may vary within the scope of the claims following below. For instance, the procedure may be used to treat any effluent or waste water containing aromatic compounds. The bacterial population that has to be formed in the biofilter may then vary in its composition in accordance with the kind of effluent to be purified. For instance, when bleaching water is being purified all requisite genes are not present in one strain of bacteria: purification requires the use of a suitable microbial mixture. It should be noted furthermore that as the bacteria proliferate their properties may change and that therefore the bactery species cannot be absolutely defined on the strength of its characteristics. It is usually held that bacteria belong to the same species if 80% of their characteristics are identical.

The procedure of the invention is not either confined to circulation: the purification may be carried out by conducting the waste water through, for instance, three consecutive tanks. In that case anaerobic conditions are provided in the middle tank and the first and last tanks are biofilters, into which air is appropriately introduced for maintenance of bacterial activity. It is also not necessary that the enriching of the bacterial population capable of purification is carried out in the same biofilter in which the actual purification takes place. Thus, a bacterial population such as has been specified in the claims may in fully processed condition be inoculated into the bark layer of the biofilter, whereby the waste water purifying process may be started at once.

TABLE I

| Group of Compounds | Water body | Effluent from alkali step | Effluent from chlorin. step | Result of purification |
|---|---|---|---|---|
| Dichlorophenols | not det. | a | a | not det. |
| Trichlorophenols | a | b | c | >50% |
| Dichloroguajacols | a | c | a | >80% |
| Dichlorodimethoxyphenols and trichloroguajacols | a | c | b | >50% |
| Dimethoxytrichlorophenols | a | b | b | not det. |
| Tetrachlorophenols | a | b | b | >80% |
| Other chlorinated aromatics | a | c | b | >95% | a = clearly discernible peak in chromatogram, quantity less than 0,02 ng/l
b = 0.02 to 0.2 mg/l
c = over 0.2 mg/l

| Strain Nos. Isolation Code | Deposition Code | Relation to $O_2$ | Gram reaction | Motility | Fluorescence 254nm | Fluorescence 366nm | Lignodulfonate | Phenol | Benzoate | Vanillate | Veratrate | Syringulate | Ferulate | p-OH-benzoate | m-OH-benzoate | Solicylate | Protocatechuate | Acetate | Succinate | Xylose | Yeast extract | Special characteristics |
|---|---|---|---|---|---|---|---|---|---|---|---|---|---|---|---|---|---|---|---|---|---|---|
| Gram-negative aerobic rods and cocci (Continued) | | | | | | | | | | | | | | | | | | | | | | |
| gnspohb72 | YM166 | a | neg | + | + | + | | + | | | | | | | | | | | | | + | + | Grows in tetrachlorophenol (100 mg/l) |
| gnspohb74 | YM27 | a | neg | + | + | + | | + | | | | | | | | + | | + | + | + | + | + | Colonies slimy |
| gnspohb75 | YM167 | a | neg | + | | | | | + | + | | | + | + | | | + | + | + | + | + | + | Grows in tetrachlorophenol (50 mg/l) |
| gnspohb77 | YM246 | a | neg | + | | | | | + | + | | | ++ | ++ | | ++ | ++ | | ++ | ++ | ++ | |
| gnspohb78 | YM169 | a | neg | + | + | + | | | + | ++ | + | + | ++ | ++ | | ++ | + | | ++ | ++ | ++ | |
| gnssy81 | YM168 | a | neg | + | | | | | ++ | ++ | + | ++ | ++ | +++ | | ++ | ++ | + | ++ | ++ | ++ | |
| gnssy82 | YM170 | a | neg | + | | | | | ++ | ++ | ++ | ++ | +++ | +++ | +++ | ++ | ++ | + | ++ | ++ | ++ | |
| gnssy84 | YM249 | a | neg | + | + | + | + | | | + | + | ++ | ++ | ++ | | | + | | ++ | + | ++ | ++ | |
| gnssy86 | YM250 | a | neg | + | | | + | | | ++ | ++ | ++ | ++ | ++ | | + | ++ | | ++ | ++ | ++ | ++ | Grows in trichlorophenol (50 mg/l) |
| gnssy87 | YM200 | a | neg | + | | | | | + | ++ | | ++ | ++ | ++ | | + | + | | + | ++ | ++ | ++ | Colonies yellow |
| gnssy88 | YM175 | a | neg | + | | | | | + | ++ | | ++ | ++ | ++ | | | ++ | | | ++ | ++ | ++ | Colonies yellow |
| gnssy89 | YM201 | a | neg | + | | | | | ++ | ++ | + | ++ | ++ | ++ | ++ | | ++ | | ++ | + | ++ | ++ | Colonies yellow |
| gnssy90 | YM202 | a | neg | + | + | | | | ++ | ++ | +++ | ++ | ++ | ++ | | | ++ | | ++ | + | ++ | ++ | Colonies yellow |
| gnssy91 | YM176 | a | neg | − | | | | | | | ++ | ++ | ++ | ++ | | | | | | | ++ | + | Colonies yellow |
| gnssy92 | YM177 | a | neg | + | | | | | | | ++ | ++ | ++ | ++ | | | | | | | ++ | + | Colonies yellow |
| gnssy93 | YM178 | a | neg | + | | | | | | | | ++ | ++ | ++ | | | | | | | | + | Colonies yellow |
| gnssy94 | YM179 | a | neg | + | | | | | | | | + | ++ | ++ | | + | | | | | + | + | Grows in tetrachlorophenol (50 mg/l) |
| gnssy98 | YM251 | a | neg | + | | | | | | | | | | | | | | | | | + | + | Grows in trichlorophenol (50 mg/l) |
| gnssy100 | YM252 | a | neg | + | | | | + | + | + | | + | | + | | | | | | + | + | + | Grows in tetrachlorophenol (100 mg/l) |
| gns22346f102 | YM253 | a | neg | + | | | + | | + | | | | + | | | | | | | | + | + | |
| Gram-negative facultatively aerobic rods and cocci (Classification Group VI): | | | | | | | | | | | | | | | | | | | | | | |
| gnsva3 | YM136 | f | neg | + | | | | | ++ | ++ | ++ | ++ | ++ | ++ | | ++ | + | | + | ++ | ++ | ++ | |
| gnsvaY8 | YM149 | f | neg | + | + | + | | | ++ | ++ | ++ | ++ | ++ | +++ | ++ | | ++ | | + | ++ | ++ | ++ | |
| gnsv827 | YN149 | f | neg | + | + | + | | | ++ | ++ | ++ | ++ | ++ | ++ | + | | ++ | | | ++ | ++ | ++ | |
| gnsve33 | YM183 | f | neg | + | | | | | ++ | ++ | ++ | ++ | ++ | ++ | | | ++ | | | ++ | ++ | ++ | |
| gnsve36 | YM198 | f | neg | + | | | | | ++ | ++ | ++ | ++ | ++ | ++ | | | ++ | | + | ++ | ++ | ++ | |
| gnsve37 | YM199 | f | neg | + | | | | | ++ | ++ | ++ | ++ | ++ | ++ | + | | ++ | | + | ++ | ++ | ++ | |
| gnsfe41 | YM150 | f | neg | + | | | | | ++ | ++ | ++ | ++ | ++ | ++ | | | ++ | | | ++ | ++ | ++ | |
| gnsfe47 | YM151 | f | neg | + | | | + | | ++ | ++ | ++ | ++ | ++ | ++ | | + | ++ | + | + | ++ | ++ | ++ | |
| gnspohb64 | YM254 | f | neg | + | | | | | + | | | | + | | | | | | | + | + | + | + | |
| gnspohb69 | YM165 | f | neg | + | | | | ++ | ++ | ++ | ++ | + | ++ | ++ | ++ | | ++ | | ++ | ++ | ++ | ++ | Grows in trichlorophenol (500 mg/l) |
| gnspohb73 | YM255 | f | neg | + | | | + | ++ | ++ | ++ | ++ | ++ | ++ | ++ | | + | ++ | | + | ++ | ++ | ++ | Grows in trichlorophenol (50 mg/l) |
| gnspohb76 | YM256 | f | neg | + | | | ++ | | ++ | + | | ++ | + | + | | | + | + | | + | + | + | + | Colonies slimy |
| gnspohb80 | YM257 | f | neg | + | + | + | ++ | | + | ++ | + | + | + | + | | | + | + | | + | + | + | + | Grows in trichlorophenol (100 mg/l) |
| gnssy95 | YM187 | f | neg | + | | | | + | + | + | | + | + | + | | + | + | | | + | + | + | + | Yellow colonies |

-continued

| Strain Nos. Isolation Code | Deposition Code | Relation to O₂ | Gram reaction | Motility | Fluorescence 254nm | Fluorescence 366nm | Ligno-dul-fonate | Phenol | Ben-zo-ate | Van-il-ate | Vera-trate | Syr-in-gu-late | Feru-late | p-OH-benz-oate | m-OH-benz-oate | Sali-cylate | Proto-catech-uate | Ace-tate | Suc-cin-ate | Xy-lose | Yeast extract | Special characteristics |
|---|---|---|---|---|---|---|---|---|---|---|---|---|---|---|---|---|---|---|---|---|---|---|
| gntkl97 | YM258 | f | neg | + | + | | + | | + | | | | | | | | | | | + | + | Grows in tetrachlorophenol (50 mg/l) |
| gns2346f101 | YM259 | f | neg | + | | | + | | + | + | | | | + | | | + | + | + | + | + | Grows in tetrachlorophenol (100 mg/l) |
| *Gram-variable rods and cocci:* | | | | | | | | | | | | | | | | | | | | | | |
| gvsfe42 | YM260 | a | var | + | | | | | | | | | + | + | | + | | + | + | + | + | |
| gvafe43 | YM151 | a | var | + | | | | | + | + | | | + | + | | + | | + | + | + | + | |
| gvsfe44 | YM261 | a | var | + | | | | | + | + | | | + | + | | + | | + | + | + | + | Grows in trichlorophenol (50 mg/l) |
| gvsfe46 | YM262 | a | var | + | | | | | + | + | | | | + | | + | | + | + | + | + | |
| gvsfe48 | YM263 | a | var | + | | | | + | + | + | | | + | + | + | + | + | + | + | + | + | |
| gvspohb66 | YM161 | a | var | + | | | | | + | + | + | | | + | + | + | + | + | + | + | + | Yellow colonies |
| gvssy85 | YM174 | a | var | − | | | | | | | + | | | | | | + | + | + | + | + | + | Grows in trichlorophenol (50 mg/l) |
| gvssy96 | YM264 | a | var | + | | | + | | + | + | | + | + | + | + | + | + | + | + | + | + | + | |
| *Gram-variable facultatively aerobic rods and cocci:* | | | | | | | | | | | | | | | | | | | | | | |
| gvsfe56 | YM265 | f | var | + | | | + | | + | + | | | + | + | + | + | + | + | + | + | + | + | Grows in trichlorophenol (50 mg/l) |
| gvspohb70 | YM266 | f | var | + | | | | | + | + | | | | + | + | | + | + | + | + | + | + | Grows in trichlorophenol (50 mg/l) |
| gvssy99 | YM267 | f | var | + | | | | | + | + | | + | | + | | | + | | + | + | | + | Grows in trichlorophenol (50 mg/l) |
| *Gram-positive bacteria:* | | | | | | | | | | | | | | | | | | | | | | |
| gppohb79 | YM268 | f | pos | + | | | + | | + | | | | | + | | | | | | | + | + | Grows in trichlorophenol (100 g/l) |

Table 2

LIST OF CERTAIN PROPERTIES OF PURE CULTURES OBTAINED FROM THE BACTERIA ACTING IN THE PURIFICATION PROCESS

| Strain Nos. Deposition Code | Isolation Code | Relation to O₂ | Gram reaction | Motility | Fluorescence 254nm | Fluorescence 366nm | Ligno-sulfonate | Phenol | Benzoate | Vanillate | Veratrate | Syringu-late | Ferulate | p-OH-benzoate | m-OH-benzoate | Salicylate | Protocatechuate | Acetate | Succinate | Xylose | Yeast extract | Special characteristics |
|---|---|---|---|---|---|---|---|---|---|---|---|---|---|---|---|---|---|---|---|---|---|---|
| *Gram-negative aerobic rods and cocci (Classification Group V):* | | | | | | | | | | | | | | | | | | | | | | |
| gnsva1 | YM134 | a | neg | + | + | | | + | + | ++ | | | | | | | | ++ | + | | ++ | Grows in trichlorophenol (500 mg/l) |
| gnsva2 | YM135 | a | neg | + | + | | | | + | ++ | | | | | | | | ++ | + | ++ | ++ | |
| gnsva4 | YM137 | a | neg | + | ++ | ++ | | | | ++ | ++ | | + | ++ | | | ++ | ++ | ++ | ++ | + | |
| gnsva5 | YM241 | a | neg | + | + | + | | | + | + | | | | + | | | ++ | ++ | ++ | ++ | + | |
| gnsva6 | YM138 | a | neg | + | + | + | | | +++ | ++ | | | | ++ | | | ++ | +++ | ++ | +++ | ++ | |
| gnsva7 | YM139 | a | neg | + | | | | ++ | +++ | ++ | + | | + | ++ | + | | ++ | ++ | ++ | ++ | ++ | |
| gnsva8 | YM140 | a | neg | + | ++ | ++ | | | +++ | ++ | ++ | | | ++ | ++ | | ++ | ++ | ++ | ++ | ++ | |
| gnsva9 | YM141 | a | neg | + | ++ | ++ | | | ++ | ++ | | | ++ | ++ | ++ | | ++ | ++ | ++ | ++ | ++ | |
| gnsva10 | YM142 | a | neg | + | + | ++ | | | ++ | ++ | + | | ++ | ++ | | + | ++ | | ++ | ++ | ++ | |
| gnsva11 | YM143 | a | neg | + | ++ | ++ | | | ++ | ++ | | | +++ | ++ | | | ++ | +++ | ++ | + | ++ | |
| gnsva12 | YM171 | a | neg | + | ++ | ++ | | | +++ | ++ | | | +++ | ++ | ++ | + | ++ | ++ | ++ | + | ++ | |
| gnsva13 | YM172 | a | neg | + | + | ++ | + | | +++ | ++ | | | ++ | ++ | | | ++ | ++ | ++ | ++ | ++ | |
| gnsva14 | YM144 | a | neg | + | ++ | ++ | | | ++ | ++ | | | ++ | ++ | | | ++ | ++ | ++ | + | ++ | Grows in trichlorophenol (50 mg/l) |
| gnsva15 | YM242 | a | neg | + | ++ | ++ | | + | ++ | ++ | | + | ++ | ++ | + | | ++ | ++ | ++ | + | ++ | Grows in trichlorophenol (100 mg/l) |
| gnsva16 | YM243 | a | neg | + | + | + | | | + | + | + | | | + | | | + | + | ++ | + | + | |
| gnsva17 | YM145 | a | neg | — | ++ | ++ | | | +++ | +++ | +++ | + | +++ | +++ | +++ | | +++ | ++ | +++ | +++ | +++ | |
| gnsva19 | YM147 | a | neg | + | ++ | ++ | | | +++ | +++ | +++ | + | +++ | +++ | +++ | | +++ | ++ | +++ | +++ | +++ | |
| gnsva20 | YM148 | a | neg | — | | | | | ++++ | +++ | ++ | ++ | ++++ | ++++ | ++++ | | ++++ | | ++++ | ++++ | ++++ | |
| gnsve21 | YM188 | a | neg | + | | | | | +++ | +++ | ++++ | +++ | ++++ | ++++ | ++++ | | ++++ | | ++++ | ++++ | ++++ | |
| gnsve22 | YM189 | a | neg | + | | | | | ++ | +++ | ++++ | ++ | ++++ | ++++ | ++++ | | ++++ | | ++++ | ++++ | ++++ | |
| gnsve23 | YM190 | a | neg | + | | | | | ++ | +++ | ++++ | ++ | ++++ | ++++ | +++ | | ++++ | | ++++ | ++++ | ++++ | |
| gnsve24 | YM191 | a | neg | + | | | | | ++ | +++ | ++++ | ++ | ++++ | ++++ | ++++ | | ++++ | | ++++ | ++++ | ++++ | |
| gnsve25 | YM192 | a | neg | + | | | | | ++ | +++ | ++++ | ++ | +++ | ++++ | +++ | | ++++ | | ++++ | ++++ | ++++ | |
| gnsve26 | YM193 | a | neg | + | | | | | ++ | +++ | ++++ | ++ | ++++ | ++++ | ++++ | | ++++ | | ++++ | ++++ | ++++ | |
| gnsve28 | YM194 | a | neg | + | | | | | ++ | +++ | ++++ | ++ | ++++ | ++++ | +++ | | +++ | | ++++ | ++++ | ++++ | |
| gnsve29 | YM195 | a | neg | + | | | | | ++ | +++ | ++++ | ++ | ++++ | ++++ | ++++ | | ++++ | | ++++ | ++++ | ++++ | |
| gnsve30 | YM180 | a | neg | + | | | | | | ++ | ++ | | + | + | + | | ++ | | ++ | ++ | ++ | |
| gnsve31 | YM181 | a | neg | + | | | | | | ++ | ++ | | | + | | | + | + | ++ | + | ++ | |
| gnsve32 | YM182 | a | neg | + | | | | | | ++ | ++ | | | + | + | +++ | ++ | | ++ | ++ | ++ | Grows in trichlorophenol (100 mg/l) |
| gnsve34 | YM196 | a | neg | + | + | | | | ++ | ++ | + | | + | + | | | ++ | ++ | ++ | ++ | ++ | |
| gnsve35 | YM197 | a | neg | + | + | + | | | +++ | +++ | ++ | | +++ | ++ | ++ | | ++ | ++ | ++ | ++ | ++ | |
| gnsve38 | YM244 | a | neg | + | + | + | | | + | ++ | + | + | + | + | | | ++ | | ++ | ++ | ++ | |
| gnsfe49 | YM153 | a | neg | ++ | | | | | ++ | ++ | | | ++ | + | | | ++ | + | ++ | | ++ | Grows in trichlorophenol (50 mg/l) |
| gnsfe50 | YM184 | a | neg | ++ | + | + | | | ++ | + | + | | + | + | | | ++ | ++ | ++ | ++ | ++ | |
| gnsfe51 | YM154 | a | neg | ++ | | | | | ++ | ++ | + | | +++ | + | | | ++ | +++ | +++ | ++ | ++ | |
| gnsfe52 | YM164 | a | neg | ++ | | | | | ++ | ++ | + | | +++ | ++ | | | ++ | +++ | +++ | ++ | ++ | |
| gnsfe53 | YM245 | a | neg | ++ | + | + | | | + | + | + | + | + | ++ | | | + | + | + | + | ++ | Grows in trichlorophenol (50 mg/l) |
| gnsfe54 | YM185 | a | neg | + | + | + | | | + | + | + | | + | | | | + | | + | | + | |

Table 2-continued

LIST OF CERTAIN PROPERTIES OF PURE CULTURES OBTAINED FROM THE BACTERIA ACTING IN THE PURIFICATION PROCESS

| Strain Nos. | | | Rela-tion to $O_2$ | Gram re-action | Mo-til-ity | Fluo-res-cence 254nm | Fluo-res-cence 366nm | Ability to utilize as sole carbon and energy source: | | | | | | | | | | | | | | Special characteristics |
|---|---|---|---|---|---|---|---|---|---|---|---|---|---|---|---|---|---|---|---|---|---|---|---|
| Isolation Code | Depo-sition Code | | | | | | | Ligno-sul-fonate | Phenol | Ben-zo-ate | Van-il-ate | Vero-trate | Syr-in-gu-late | Feru-late | p-OH-benz-oate | m-OH-benz-oate | Sali-cylate | Proto-catech-uate | Ace-tate | Suc-cin-ate | Xy-lose | Yeast extract | |
| gnsfe55 | YM155 | | a | neg | + | | | | | + | | | | | | | | | | + | + | + | |
| gnsfe57 | YM156 | | a | neg | + | | | | | | | | | | | | | | | | + | + | |
| gnsfe58 | YM186 | | a | neg | + | + | | | | | | | | | | | | | | | + | + | |
| gnsfe59 | YM157 | | a | neg | + | | + | | | | | | | | | | | | | | + | + | |
| gnspohb61 | YM158 | | a | neg | – | | | | | | | | | | | | | | | | | + | |
| gnspohb62 | YM159 | | a | neg — | | | | | + | + | + | + | + | + | + | + | + | + | + | + | + | + | 117 |
| gnspohb63 | YM160 | | a | neg | + | | | | | + | + | + | + | + | + | + | + | + | + | | + | + | |
| gnspohb67 | YM162 | | a | neg | + | | | +++ | | + | + | + | + | + | + | + | + | + | + | + | + | + | |
| gnspohb68 | YM163 | | a | neg | + | | | | | + | + | + | + | + | + | + | + | + | | + | + | + | |
| gnspohb71 | YM246 | | a | neg | + | | | | | + | + | + | + | + | + | + | + | + | + | + | + | + | Grows in trichlorophenol (50 mg/l) |

Explanations:
a = acrobic, f = facultatively acrobic, neg = Gram-negative, var = Gram-variable, pos = Gram-positive, motility: = motile, = immotile, fluorescence: + indicates that the bacterium fluoresces

I claim:

1. A waste water purifying process for treatment of waste water containing chlorinated phenols in a biofilter having a layer containing bark of wood, said process comprising the steps of forming a bacterial population in said bark layer, said population comprising one or several of the bactery strains deposited in the University of Helsinki Institute of General Microbiology under the deposition codes YM 134-202 and YM 241-268 and which have been formed by packing into biofilters crushed coniferous tree bark and bacteriferous water, ooze, mud or bark residues taken from a water body polluted by chlorinated and unchlorinated phenols and by aromatic carboxylic acids and by thereafter feeding into the biofilters water containing said substances, whereby the bactery strains are characterized by an ability to tolerate the presence of chlorinated phenols and to use compounds selected from said chlorinated and unchlorinated phenols and aromatic carboxylic acids as their sources of carbon and energy, and then conducting the waste water to be treated through the biofilter, whereby the purification is effected by means of the bactery population working in the presence of chlorinated phenols contained in the waste water.

2. The process according to claim 1, wherein in the biofilter, a bactery population is formed which contains a strain belonging to the deposited bactery strains YM 241-268 and growing in thichlorophenol and a strain belonging to said deposited bactery strains and growing in tetrachlorophenol, whereby the bacterial population is characterized by an ability to decompose said chlorinated phenols present in a waste water.

3. The process of claim 1 wherein the waste water is a bleaching effluent from a cellulose sulfate mill which includes chlorination and alkali steps.

4. The process according to claim 3, wherein the waste water contains about 50% bleaching effluent from the chlorination step and about 50% bleaching effluent from the alkali step.

5. The process according to claim 1, wherein the waste water to be purified is circulated in such manner that the water flows through the biofilter several times.

6. The process according to claim 5, wherein air is conducted into the biofilter so that the water circulates alternately through an aerobic and an anaerobic purifying step.

7. The process according to claim 6, wherein the water is circulated from the biofilter to a separate anaerobic tank.

8. The process according to claim 1, wherein the purification is carried out in three steps wherein the waste water is first conducted into aerobic conditions into the biofilter, then into an anaerobic tank, and finally again into aerobic conditions.

* * * * *